(12) United States Patent
Allpress et al.

(10) Patent No.: US 6,392,988 B1
(45) Date of Patent: May 21, 2002

(54) TRANSMITTER ARCHITECTURE EMPLOYING SPACE TIME SPREADING AND ORTHOGONAL TRANSMIT DIVERSITY TECHNIQUES

(75) Inventors: Stephen Alan Allpress, Hoboken; R. Michael Buehrer, Morristown; Quinn Li, Madison; Nallepilli S. Ramesh, New Providence; Robert Atmaram Soni, Morris Plains, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/394,172

(22) Filed: Sep. 13, 1999

(51) Int. Cl.[7] ............................................... H04J 11/00
(52) U.S. Cl. ........................ 370/208; 370/335; 370/342
(58) Field of Search ................................. 370/206, 203, 370/208, 209, 335, 342, 479; 375/130, 135, 146, 307

(56) References Cited

U.S. PATENT DOCUMENTS 6,173,005 B1 * 1/2001 Kotzin et al. ................ 375/141
6,185,266 B1 * 2/2001 Kuchi et al. ................. 375/347
6,243,397 B1 * 6/2001 Yun ............................ 370/480

* cited by examiner

Primary Examiner—Douglas Olms
Assistant Examiner—Ken Vanderpuye
(74) Attorney, Agent, or Firm—Jimmy Goo

(57) ABSTRACT

Disclosed is a common transmitter architecture having incorporated both open loop transmit diversity schemes using a plurality of binary switches. Employment of binary switches allows for the sharing of certain components whether the transmitter is utilizing a orthogonal transmit diversity (OTD) scheme or a space time spreading (STS) scheme. Accordingly, the number of components in the transmitter is minimized and the complexity of the transmitter is simple enough to be implemented into a single application specific integrated chip.

30 Claims, 2 Drawing Sheets

TRANSMITTER ARCHITECTURE EMPLOYING SPACE TIME SPREADING AND ORTHOGONAL TRANSMIT DIVERSITY TECHNIQUES

RELATED APPLICATION

Related subject matter is disclosed in the following application and assigned to the same assignee hereof: U.S. patent application Ser. No. 09/294,661 entitled, "Method And Apparatus For Downlink Diversity In CDMA Using Walsh Codes," inventors R. Michael Buehrer, Robert Atmaram Soni, and Jiann-an Tsai, filed on Apr. 19, 1999. Related subject matter is disclosed in the following concurrently filed application and assigned to the same assignee hereof: U.S. patent application Ser. No. 09/395,325 entitled, "A Receiver Architecture Employing Space Time Spreading And Orthogonal Transmit Diversity Techniques," inventors R. Michael Buehrer, Robert Atmaram Soni and Stephen A. Allpress.

FIELD OF THE INVENTION

The present invention relates generally to wireless communication systems and, in particular, to wireless communication employing transmit diversity.

BACKGROUND OF THE RELATED ART

Several third generation wireless communication systems are being developed. One such third generation wireless communication system is known as CDMA 2000. In CDMA 2000, a variety of techniques are being incorporated for improving call quality. Open loop transmit diversity is one such technique in which user signals are transmitted using two antennas. In a first phase of CDMA 2000, open loop transmit diversity is currently being implemented in a form of orthogonal transmit diversity (OTD). In OTD, separate antennas are used to transmit even data bits and odd data bits to achieve transmit diversity and improved call quality.

In a second phase of CDMA 2000, open loop transmit diversity may be implemented in a form of space time spreading (STS) using Walsh functions or codes. STS enhances call quality by providing variable gain over OTD depending on the coding rate being used. Specifically, in STS, odd data bits and even data bits are jointly, not separately, transmitted over two antennas. However, the manner in which the odd and even data bits are modulated/ processed before being transmitted over one antenna will be different from the manner in which the odd and even data bits are modulated/processed being transmitted over the other antenna.

There has been some concern that including both open loop transmit diversity schemes as options in CDMA 2000 would be very complex in terms of implementing them into a common transmitter architecture. Accordingly, there exists a need for a simple way to implement common transmitter architecture that has incorporated orthogonal transmit diversity and space time spreading schemes.

SUMMARY OF THE INVENTION

The present invention is a common transmitter architecture having incorporated both open loop transmit diversity schemes using a plurality of binary switches. Employment of binary switches allows for the sharing of certain components whether the transmitter is utilizing a orthogonal transmit diversity (OTD) scheme or a space time spreading (STS) scheme. Accordingly, the number of components in the transmitter is minimized and the complexity of the transmitter is simple enough to be implemented into a single application specific integrated chip.

The transmitter has an OTD and a STS mode, and comprises a first and second antenna system. The first antenna system comprises time multiplexers, mixers, switches and adders. The time multiplexers are used to time multiplex an in-phase first signal with a second in-phase first signal to produce a first time multiplexed signal; a quadrature phase first signal with a second quadrature phase first signal to produce a second time multiplexed signal; an in-phase second signal with an inverted in-phase second signal to produce a third time multiplexed signal; and a quadrature phase second signal with an inverted quadrature phase second signal to produce a fourth time multiplexed signal. The mixers are used to mix outputs of the time multiplexers with a Walsh function to produce first, second, third and fourth mixed time multiplexed signals. The first and second time multiplexed signals are directed to the adders. If the transmitter is in STS mode, the switches direct the third and fourth mixed time multiplexed signals to the adders so they may be added with the first and second mixed time multiplexed signals, respectively. If the transmitter is in OTD mode, the switches do not direct the third and fourth mixed time multiplexed signals to the adders.

The second antenna system comprises time multiplexers, mixers, switches and adders. The time multiplexers are used to time multiplex an in-phase second signal with an inverted in-phase second signal when the transmitter is in the first operating mode and with an in-phase second signal when the transmitter is in the second operating mode to produce a fifth time multiplexed signal; a quadrature phase second signal with an inverted quadrature phase second signal when the transmitter is in the first operating mode and with a quadrature phase second signal when the transmitter is in the second operating mode to produce a sixth time multiplexed signal; an in-phase first signal with an inverted in-phase first signal to produce a seventh time multiplexed signal; and a quadrature phase first signal with an inverted quadrature phase first signal to produce an eighth time multiplexed signal. The mixers are used to mix outputs of the time multiplexers with a Walsh function to produce fifth, sixth, seventh and eighth mixed time multiplexed signals. The fifth and sixth time multiplexed signals are directed to the adders. If the transmitter is in STS mode, the switches direct the seventh and eighth mixed time multiplexed signals to the adders so they may be added with the fifth and sixth mixed time multiplexed signals, respectively. If the transmitter is in OTD mode, the switches do not direct the seventh and eighth mixed time multiplexed signals to the adders.

BRIEF DESCRIPTION OF THE DRAWINGS

The features, aspects and advantages of the present invention will become better understood with regard to the following description, appended claims, and accompanying drawings where:

DETAILED DESCRIPTION

Figure 1:
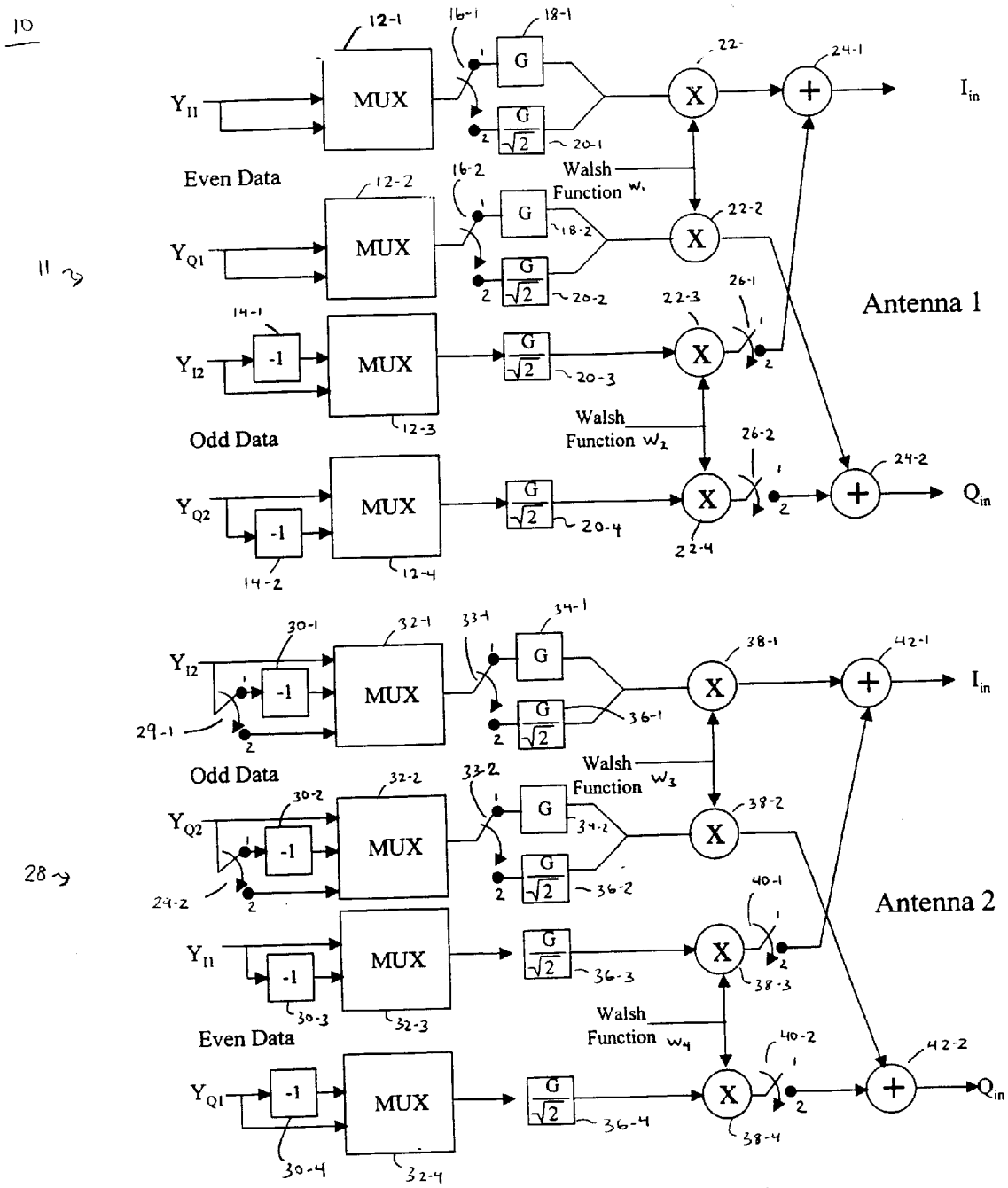
FIG. 1 depicts a transmitter employing orthogonal transmit diversity and space time spreading using Walsh functions in accordance with the present invention.

FIG. 1 depicts a common transmitter architecture 10 in accordance with the present invention. Transmitter 10 is typically incorporated at a base station, and is operable to modulate/process user signals employing either orthogonal transmit diversity or space time spreading (using Walsh or some other orthogonal function) techniques. Transmitter 10 comprises of a first antenna system 11 and a second antenna system 28. For ease of discussion, the present invention will be described herein with respect to one user signal. It should be understood, however, that the present invention can be applied to multiple user signals.

Transmitter 10 receives a user signal Y. Before user signal is modulated/processed by first and/or second antenna systems 11 and 28, user signal Y is parsed and partitioned into even and odd data bits and then into in-phase and quadrature phase signals, i.e. signal Y is converted into signals $Y_{I1}$, $Y_{Q1}$, $Y_{I2}$, and $Y_{Q2}$, wherein I represents an in-phase signal, Q represents a quadrature phase signal, 1 represents even data bits and 2 represents odd data bits. Signals $Y_{I1}$, $Y_{Q1}$, $Y_{I2}$, and $Y_{Q2}$ are provided as inputs to first and second antenna systems 11 and 28.

First antenna system 11 comprises time multiplexers 12, inverters 14, switches 16 and 26, amplifiers 18 and 20, mixers 22 and adders 24. Switches 16 and 26 have a first position and second position. When switches 16 and 26 are all in the first position, first antenna system 11 operates in orthogonal transmit diversity mode. By contrast, when switches 16 and 26 are all in the second position, first antenna system 11 operates in space time spreading mode.

User signal $Y_{I1}$ is provided twice as input to time multiplexer 12-1. The output of time multiplexer 12-1 is a time multiplexed signal of signal $Y_{I1}$ with itself. When switch 16-1 is in the first position, i.e., OTD mode, the output of time multiplexer 12-1 is directed to amplifier 18-1 where it is amplified a gain G by amplifier 18-1. When switch 16-1 is in the second position, i.e., STS mode, the output of time multiplexer 12-1 is directed to amplifier 20-1 where it is amplified a gain $$\frac{G}{\sqrt{2}}$$

by amplifier 20-1.

The outputs of amplifier 18-1 and amplifier 20-1 are mixed at mixer 22-1 with a Walsh function $W_1$, and then provided as input to adder 24-1. Note that mixer 22-1 should only receive an input from either amplifier 18-1 or 20-1 at any one time, and that some other orthogonal (or quasi-orthogonal) function may be used to mix the output of amplifier 18-1 and 20-1 instead of Walsh functions. If first antenna system 11 is in STS mode, i.e., switches 16 and 26 are all in the second position, the output of mixer 22-1 is added to an output of mixer 22-3 by adder 24-1 before being transmitted. By contrast, if first antenna system 11 is in OTD mode, i.e., switches 16 and 26 are all in the first position, the output of mixer 22-1 is not added to the output of mixer 22-3 by adder 24-1 before being transmitted.

User signal $Y_{QI}$ is processed in a similar manner as user signal $Y_{I1}$ using time multiplexer 12-2, switch 16-2, amplifiers 18-2 and 20-2, mixer 22-2, adder 24-2 and Walsh function $W_1$.

User signal $Y_{I2}$ is provided as input to time multiplexer 12-3 along with an inverted signal of $Y_{I2}$ (i.e. output of inverter 14-1). The output of the time multiplexer 12-3 is then provided as input to amplifier 20-3, where it is amplified a gain $$\frac{G}{\sqrt{2}}.$$

The output of amplifier 20-3 is mixed with a Walsh function $W_2$ by mixer 22-3. When switch 26-1 is in the second position, the output of mixer 22-3 is provided as input to adder 24-1 where it can be added to the output of mixer 22-1. By contrast, when switch 26-1 is in the first position, the output of mixer 22-3 is not provided as input to adder 24-1.

Note that the amplifiers used by first antenna system 11 has a gain of $$\frac{G}{\sqrt{2}}$$

when it is in STS mode and a gain of G when it is in OTD mode. Such configuration allows for a same output power by first antenna system 11 regardless of the mode. But it should be understood that any configuration of amplifiers and gains may be used. Further note that when first antenna system 11 is in OTD mode, it transmits only even data bits. By contrast, when first antenna system 11 is in STS mode, it transmits both even and odd data bits.

User signal $Y_{Q2}$ is processed in a similar manner as signal $Y_{I2}$ using time multiplexer 12-4, inverter 14-2, amplifier 20-4, mixer 22-4, switch 26-2, adder 24-2 and Walsh function $W_2$.

Second antenna system 28 comprises switches 29, 33 and 40, inverters 30, time multiplexers 32, amplifiers 34 and 36, mixers 38 and adders 42. Switches 29, 33 and 40 have a first and second position. When switches 29, 33 and 40 are in the first position, second antenna system 28 operates in OTD mode. By contrast, when switches 29, 33, and 40 are in the second position, second antenna system 28 operates in STS mode.

When switch 29-1 is in the first position, user signal $Y_{I2}$ is provided as input to time multiplexer 32-1 along with an inverted user signal $Y_{I2}$ (i.e., output of inverter 30-1). When switch 29-1 is in the second position, user signal $Y_{I2}$ is provided twice as input to time multiplexer 32-1. In time multiplexer 32-1, user signal $Y_{I2}$ is time multiplexed with itself or its inverted self depending on the position of switch 29-1 (or mode of second antenna system 28).

When switch 33-1 is in the first position, the output of time multiplexer 32-1 is directed to amplifier 34-1, where the time multiplexed signal is amplified a gain G by amplifier 34-1. When switch 33-1 is in the second position, the output of time multiplexer 32-1 is directed to amplifier 36-1, where the time multiplexed signal is amplified a gain $$\frac{G}{\sqrt{2}}$$

by amplifier 36-1.

The outputs of amplifiers 34-1 and 36-1 are provided as input to mixer 38-1, where they are mixed with Walsh functions $W_3$. Note that mixer 38-1 should only receive an input from either amplifier 34-1 or 36-1 at any one time, not both simultaneously. If second antenna system 28 is in STS mode, i.e., switches 29, 33 and 40 are all in the second position, the output of mixer 38-1 is added to an output of mixer 38-3 by adder 42-1 before being transmitted. By contrast, if second antenna system 28 is in OTD mode, i.e., switches 29, 33 and 40 are all in the first position, the output of mixer 38-1 is not added to the output of mixer 38-3 by adder 42-1 before being transmitted.

User signal $Y_{Q2}$ is processed in a similar manner to user signal $Y_{I2}$ using switches 29-2, 33-2 and 40-2, inverter 30-2, time multiplexer 32-2, amplifiers 34-2 and 36-2, mixer 38-2, adder 42-2 and Walsh function $W_3$.

User signal $Y_{I1}$ is provided as input to time multiplexer 32-3 along with an inverted user signal $Y_{I2}$. In time multiplexer 32-3, user signal $Y_{I1}$ is time multiplexed with its inverted self. The output of time multiplexer 32-3 is amplified a gain $$\frac{G}{\sqrt{2}}$$

by amplifier 36-3.

The output of amplifier 36-3 is mixed in mixer 38-3 with Walsh function $W_4$. When switch 40-1 is in the second position, the output of mixer 38-3 is provided as input to adder 42-1 where it is added to the output of mixer 38-1. When switch 40-1 is in the first position, the output of mixer 38-3 is not provided as input to adder 42-1.

User signal $Y_{QI}$ is processed in a similar manner to user signal $Y_{I1}$ using inverter 30-4, time multiplexer 32-4, amplifier 36-4, mixer 38-4, switch 40-2 and adder 42-2.

Note that, like the amplifiers of first antenna system 11, the amplifiers of second antenna system 28 has a gain of $$\frac{G}{\sqrt{2}}$$

when it is in STS mode and a gain of G when it is in OTD mode. Such configuration allows for a same output power by second antenna system 11 regardless of the mode. But it should be understood that any configuration of amplifiers and gains may be used. Further note that when second antenna system 28 is in OTD mode, it transmits only odd data bits. By contrast, when second antenna system 28 is in STS mode, it transmits both even and odd data bits.

In a preferred embodiment, Walsh functions $W_1$, $W_2$, $W_3$ and $W_4$ are identical. Note that for ease of discussion, a common receiver architecture is disclosed herein that assumes that Walsh functions $W_1$, $W_2$, $W_3$ and $W_4$ are identical. It should be understood that the different Walsh functions $W_1$, $W_2$, $W_3$ and $W_4$ or combinations thereof may also be used, and that the common receiver architecture disclosed herein could be adapted for different Walsh functions $W_1$, $W_2$, $W_3$ and $W_4$ or combinations thereof.

Figure 2:
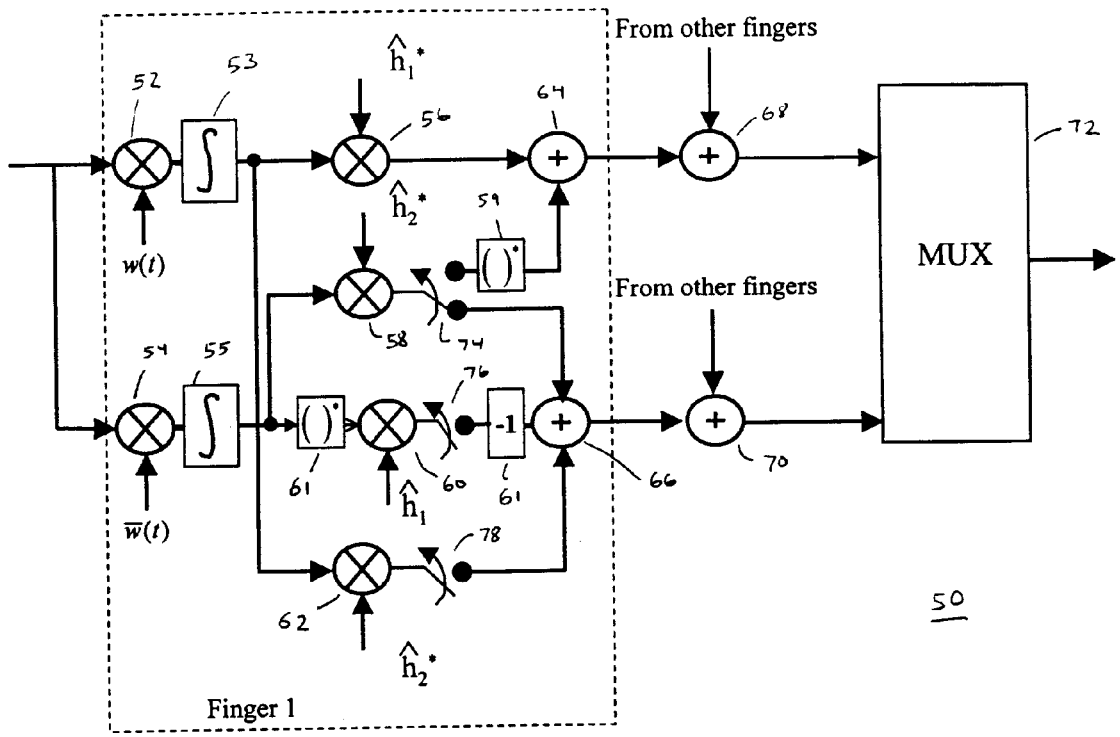
FIG. 2 depicts one finger of a receiver employing orthogonal transmit diversity and space time spreading using Walsh functions in accordance with the present invention.

Opposite of transmitter 10 is a receiver (typically incorporated at a mobile-station) for receiving and demodulating/processing the signals transmitted by transmitter 10. FIG. 2 depicts one finger 50 of a common receiver architecture in accordance with the present invention. Finger 50 being operable to demodulate/process received signals (transmitted by transmitter 10 or equivalent) employing either orthogonal transmit diversity or space time spreading (using Walsh or some other orthogonal function) techniques. Finger 50 comprises mixers 52, 54, 56, 58, 60 and 62, adders 64, 66, 68 and 70, time multiplexer 72, inverters 59, 61 and 63, integrators 53 and 55 and switches 74, 76 and 78. Switches 74, 76 and 78 have a first and a second position. When switches 74, 76 and 78 are all in the first position, finger 50 operates in OTD mode. By contrast, when switches 74, 76 and 78 are all in the second position, finger 50 operates in STS mode.

When finger 50 receives a signal r(t), received signal r(t) is provided as inputs to mixers 52 and 54. In mixer 52, received signal r(t) is mixed with an extended Walsh function w(t), i.e., repeated Walsh function w(t). The output of mixer 52 is provided as input to integrator 53. In mixer 54, received signal r(t) is mixed with a function $\overline{w}(t)$, which is a complement of the extended Walsh function w(t). The output of mixer 54 is provided as input to integrator 55. Recall that for ease of discussion, it is assumed that Walsh functions $W_1$, $W_2$, $W_3$ and $W_4$ are identical at transmitter 10. Accordingly, Walsh function w(t) is identical to Walsh functions $W_1$, $W_2$, $W_3$ and $W_4$.

In integrators 53 and 55, the outputs of mixers 52 and 54 are integrated over the length of the Walsh functions w(t) or $\overline{w}(t)$ (or symbol rate) and then dumped. Note that the mixers 52 and 54 mixes at a chip rate. The output of integrator 53 is provided as inputs to mixers 56 and 62. The output of integrator 55 is provided as input to mixer 58, and a conjugate of the output of mixer 54 is provided as input to mixer 60, wherein the conjugate of the output of mixer 54 is obtained by inverting a quadrature stream of the output of mixer 54 using inverter 61.

In mixer 56, the output of mixer 52 is mixed with a signal $\hat{h}_1^*$ representing a conjugate of a channel estimate for first antenna system 11. In mixer 62, the output of mixer 52 is mixed with a signal $\hat{h}_2^*$ representing a conjugate of a channel estimate for second antenna system 28. In mixer 58, the output of mixer 54 is mixed with the signal $\hat{h}_2^*$. In mixer 60, the conjugate of the output of mixer 54 is mixed with a signal $\hat{h}_1$ representing a channel estimate for first antenna system 11. Note that, in one embodiment, the channel estimates for first and second antenna systems 11 and 28 are obtained using pilot signals transmitted from first and second antenna systems 11 and 28, respectively.

The output of mixer 56 is provided as input to adder 64. When switch 74 is in the second position, a conjugate of the output of mixer 58 is also provided as input to adder 64 where the conjugate of the output of mixers 58 and the output of mixer 56 are added together. Note that the conjugate of the output of mixer 58 is obtained by inverting a quadrature stream of the output of mixer 58 using inverter 59. The output of adder 64 is provided as input to adder 68, where it is added with outputs of same relative mixers from other fingers.

When switch 74 is in the first position, the output of mixer 58 is provided as input to adder 66. When switches 76 and 78 are in the second position, an inverted output of mixer 60 (via inverter 63) and the output of mixer 62 are provided as inputs to adder 66. When switches 76 and 78 are in the first position, the inverted output of mixer 60 and the output of mixers 62 are not provided as inputs to adder 66. Note that the output mixer 58 should not be provided as input to adder 66 at the same time as the inverted output of mixer 60 and output of mixer 62. The output of adder 66 is provided as input to adder 70, where it is added with outputs of same relative mixers from other fingers.

The outputs of adders 68 and 70 are time multiplexed with each other by time multiplexer 72 and directed to a decoder, not shown. Note that in either mode, output of mixer 64 corresponds to a received version of the even data bits and the output of mixer 66 corresponds to a received version of the odd data bits.

The present invention is described herein with reference to certain embodiments, such as wireless communication systems based on third generation code division multiple access techniques. It should be understood that the present invention may be applicable to wireless communications based on other multiple access techniques. Additionally, instead of even and odd data bits for a same user signal, the present invention may be applied to even and odd data bits for different user signals or some other combinations. The present invention may also be applied to two identical non-partitioned (into odd and even data bits) user signals. Accordingly, the present invention should not be limited to the embodiments disclosed herein.

We claim:

1. A transmitter comprising:
   a first time multiplexer for time multiplexing an in-phase first signal with a second in-phase first signal;
   a first mixer for mixing an output of the first time multiplexer with a first function;
   a second time multiplexer for time multiplexing a quadrature phase first signal with a second quadrature phase first signal;
   a second mixer for mixing an output of the second time multiplexer with the first function;
   a third time multiplexer for time multiplexing an in-phase second signal with an inverted in-phase second signal;
   a third mixer for mixing an output of the third time multiplexer with a second function;
   a fourth time multiplexer for time multiplexing a quadrature phase second signal with an inverted quadrature phase second signal;
   a fourth mixer for mixing an output of the fourth time multiplexer with the second function;
   a first switch having a first and second position for directing an output of the third mixer;
   a second switch having a first and second position for directing an output of the fourth mixer;
   a first adder for adding an output of the first mixer and the output of the third mixer when the first switch is in the second position and not when the first switch is in the first position; and
   a second adder for adding an output of the second mixer and the output of the fourth mixer when the second switch is in the second position and not when the second switch is in the first position.

2. The transmitter of claim 1, wherein the first and second functions are orthogonal or quasi-orthogonal functions.

3. The transmitter of claim 1, wherein the first and second functions are Walsh functions.

4. The transmitter of claim 1, wherein the first and second functions are different.

5. The transmitter of claim 1, wherein the first and second functions are identical.

6. The transmitter of claim 1 further comprising:
   a first amplifier for amplifying the output of the first time multiplexer;
   a second amplifier for amplifying the output of the second time multiplexer;
   a third amplifier for amplifying the output of the third time multiplexer; and
   a fourth amplifier for amplifying the output of the fourth time multiplexer.

7. The transmitter of claim 6, wherein the third amplifier amplifies the output of the third time multiplexer by a gain $$\frac{G}{\sqrt{2}},$$

the fourth amplifier amplifies the output of the fourth time multiplexer by a gain $$\frac{G}{\sqrt{2}},$$

the first amplifier comprises a first amplifier A for amplifying the output of the first time multiplexer by a gain G and a first amplifier B for amplifying the output of the first time multiplexer by a gain $$\frac{G}{\sqrt{2}},$$

and the second amplifier comprises a second amplifier A for amplifying the output of the second time multiplexer by a gain G and a second amplifier B for amplifying the output of the second time multiplexer by a gain $$\frac{G}{\sqrt{2}}.$$

8. The transmitter of claim 7, wherein the transmitter is in a first operating mode when the first and second switches are in the first position and in a second operating mode when the first and second switches are in the second position, the transmitter further comprising:
   a third switch for directing the output of the first time multiplexer to the first amplifier A when the transmitter is in the first operating mode and to the first amplifier B when the transmitter is in the second operating mode; and
   a fourth switch for directing the output of the second time multiplexer to the second amplifier A when the transmitter is in the first operating mode and to the second amplifier B when the transmitter is in the second operating mode.

9. The transmitter of claim 1, wherein the in-phase and quadrature phase first signals comprise even data bits of a user signal and the in-phase and quadrature phase second signals comprise odd data bits of the user signal.

10. The transmitter of claim 1, wherein the in-phase and quadrature phase first signals and the in-phase and quadrature phase second signals are identical signals.

11. The transmitter of claim 1, wherein the in-phase and quadrature phase first signals and the in-phase and quadrature phase second signals are different signals.

12. The transmitter of claim 1 wherein the transmitter is in a first operating mode when the first and second switches are in the first position and in a second operating mode when the first and second switches are in the second position, the transmitter further comprising:
   a fifth time multiplexer for time multiplexing a second in-phase second signal with a second inverted in-phase second signal when the transmitter is in the first operating mode and with a third in-phase second signal when the transmitter is in the second operating mode;
   a fifth mixer for mixing an output of the fifth time multiplexer with a third function;
   a sixth time multiplexer for time multiplexing a second quadrature phase second signal with a second inverted quadrature phase second signal when the transmitter is in the first operating mode and with a third quadrature phase second signal when the transmitter is in the second operating mode;
   a sixth mixer for mixing an output of the sixth time multiplexer with the third function;

a seventh time multiplexer for time multiplexing a third in-phase first signal with an inverted in-phase first signal;

a seventh mixer for mixing an output of the seventh time multiplexer with a fourth function;

an eighth time multiplexer for time multiplexing a third quadrature phase first signal with an inverted quadrature phase first signal;

an eighth mixer for mixing an output of the eighth time multiplexer with the fourth function;

a third adder for adding an output of the fifth mixer and an output of the seventh mixer when the transmitter is in the second operating mode; and a fourth adder for adding an output of the sixth mixer and an output of the eighth mixer when the transmitter is in the second operating mode.

13. The transmitter of claim 12 further comprising:
a third switch having a first and second position, wherein the output of the seventh mixer is directed to the third adder when the third switch is in the second position and not directed to the third adder when the third switch is in the first position; and a fourth switch having a first and second position, wherein the output of the eighth mixer is directed to the fourth adder when the fourth switch is in the second position and not directed to the fourth adder when the fourth switch is in the first position.

14. The transmitter of claim 12, wherein the first and second functions are orthogonal or quasi-orthogonal functions.

15. The transmitter of claim 12 further comprising:
a first inverter for inverting the third in-phase second signal to produce the second inverted in-phase second signal;

a second inverter for inverting the third quadrature phase second signal to produce the second inverted quadrature phase second signal;

a third switch having a first and second position, wherein the third in-phase second signal is directed to the fifth time multiplexer when the third switch is in the second position and directed to the first inverter when the third switch is in the first position; and a fourth switch having a first and second position, wherein the third quadrature phase second signal is directed to the sixth time multiplexer when the fourth switch is in the second position and directed to the second inverter when the fourth switch is in the first position.

16. The transmitter of claim 12 further comprising:
a first amplifier for amplifying the output of the fifth multiplexer;

a second amplifier for amplifying the output of the sixth time multiplexer;

a third amplifier for amplifying the output of the seventh time multiplexer; and a fourth amplifier for amplifying the output of the eighth time multiplexer.

17. The transmitter of claim 16, wherein the third amplifier amplifies the output of the seventh time multiplexer by a gain $$\frac{G}{\sqrt{2}},$$

the fourth amplifier amplifies the output of the eighth time multiplexer by a gain $$\frac{G}{\sqrt{2}},$$

the first amplifier comprises a first amplifier A for amplifying the output of the fifth time multiplexer by a gain G and a first amplifier B for amplifying the output of the fifth time multiplexer by a gain $$\frac{G}{\sqrt{2}},$$

and the second amplifier comprises a second amplifier A for amplifying the output of the sixth time multiplexer by a gain G and a second amplifier B for amplifying the output of the sixth time multiplexer by a gain $$\frac{G}{\sqrt{2}}.$$

18. The transmitter of claim 17 further comprising:
a first switch for directing the output of the fifth time multiplexer to the first amplifier A when the transmitter is in the first operating mode and to the first amplifier B when the transmitter is in the second operating mode; and a second switch for directing the output of the sixth time multiplexer to the second amplifier A when the transmitter is in the first operating mode and to the second amplifier B when the transmitter is in the second operating mode.

19. A transmitter having a first and a second operating mode comprising:
a first time multiplexer for time multiplexing an in-phase first signal with an inverted in-phase first signal when the transmitter is in the first operating mode and with a second in-phase first signal when the transmitter is in the second operating mode;

a first mixer for mixing an output of the first time multiplexer with a first function;

a second time multiplexer for time multiplexing a quadrature phase first signal with an inverted quadrature phase first signal when the transmitter is in the first operating mode and with a second quadrature phase first signal when the transmitter is in the second operating mode;

a second mixer for mixing an output of the second time multiplexer with the first function;

a third time multiplexer for time multiplexing an in-phase second signal with an inverted in-phase second signal;

a third mixer for mixing an output of the third time multiplexer with a second function;

a fourth time multiplexer for time multiplexing a quadrature phase second signal with an inverted quadrature phase second signal;

a fourth mixer for mixing an output of the fourth time multiplexer with the second function;

a first switch having a first and second position for directing an output of the third mixer;

a second switch having a first and second position for directing an output of the fourth mixer;

a first adder for adding an output of the first mixer and the output of the third mixer when the first switch is in the second position and not when the first switch is in the first position; and a second adder for adding an output of the second mixer and the output of the fourth mixer when the second switch is in the second position and not when the second switch is in the first position.

20. The transmitter of claim 19, wherein the first and second functions are orthogonal or quasi-orthogonal functions.

21. The transmitter of claim 19, wherein the first and second functions are Walsh functions.

22. The transmitter of claim 19, wherein the first and second functions are different.

23. The transmitter of claim 19, wherein the first and second functions are identical.

24. The transmitter of claim 19 further comprising:

a first inverter for inverting the second in-phase first signal to produce the inverted in-phase first signal;

a second inverter for inverting the second quadrature phase first signal to produce the inverted quadrature phase first signal;

a third inverter for inverting a second in-phase second signal to produce the inverted in-phase second signal;

a fourth inverter for inverting a second quadrature second signal to produce the inverted quadrature second signal;

a third switch having a first and second position for directing the second in-phase first signal, wherein the second in-phase first signal is directed to the first time multiplexer when the third switch is in the second position and directed to the first inverter when the third switch is in the first position; and a fourth switch having a first and second position for directing the second quadrature phase first signal, wherein the second quadrature phase first signal is directed to the second time multiplexer when the fourth switch is in the second position and directed to the second inverter when the fourth switch is in the first position.

25. The transmitter of claim 19 further comprising:

a first amplifier for amplifying the output of the first multiplexer;

a second amplifier for amplifying the output of the second time multiplexer;

a third amplifier for amplifying the output of the third time multiplexer; and a fourth amplifier for amplifying the output of the fourth time multiplexer.

26. The transmitter of claim 25, wherein the third amplifier amplifies the output of the third time multiplexer by a gain $$\frac{G}{\sqrt{2}},$$

the fourth amplifier amplifies the output of the fourth time multiplexer by a gain $$\frac{G}{\sqrt{2}},$$

the first amplifier comprises a first amplifier A for amplifying the output of the first time multiplexer by a gain G and a first amplifier B for amplifying the output of the first time multiplexer by a gain $$\frac{G}{\sqrt{2}},$$

and the second amplifier comprises a second amplifier A for amplifying the output of the second time multiplexer by a gain G and a second amplifier B for amplifying the output of the second time multiplexer by a gain $$\frac{G}{\sqrt{2}}.$$

27. The transmitter of claim 26 further comprising:

a third switch for directing the output of the first time multiplexer to the first amplifier A when the transmitter is in the first operating mode and to the first amplifier B when the transmitter is in the second operating mode; and a fourth switch for directing the output of the second time multiplexer to the second amplifier A when the transmitter is in the first operating mode and to the second amplifier B when the transmitter is in the second operating mode.

28. The transmitter of claim 19, wherein the in-phase and quadrature phase first signals comprise even data bits of a user signal and the in-phase and quadrature phase second signals comprise odd data bits of the user signal.

29. The transmitter of claim 19, wherein the in-phase and quadrature phase first signals and the in-phase and quadrature phase second signals are identical signals.

30. The transmitter of claim 19, wherein the in-phase and quadrature phase first signals and the in-phase and quadrature phase second signals are different signals.

* * * * *